United States Patent
Chen

(10) Patent No.: US 9,766,387 B2
(45) Date of Patent: Sep. 19, 2017

(54) LIGHT GUIDING PLATE, BACKLIGHT MODULE AND DISPLAY

(71) Applicant: Wuhan China Star Optoelectronics Technology Co., Ltd., Wuhan, Hubei (CN)

(72) Inventor: Lingyan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 28 days.

(21) Appl. No.: 14/655,592

(22) PCT Filed: Jun. 2, 2015

(86) PCT No.: PCT/CN2015/080583
§ 371 (c)(1),
(2) Date: Jun. 25, 2015

(87) PCT Pub. No.: WO2016/183879
PCT Pub. Date: Nov. 24, 2016

(65) Prior Publication Data
US 2016/0341876 A1 Nov. 24, 2016

(30) Foreign Application Priority Data
May 19, 2015 (CN) .......................... 2015 1 0257881

(51) Int. Cl.
*G02F 1/1335* (2006.01)
*F21V 8/00* (2006.01)

(52) U.S. Cl.
CPC .......... *G02B 6/0026* (2013.01); *G02B 6/0003* (2013.01); *G02B 6/0088* (2013.01); *G02F 2001/133614* (2013.01)

(58) Field of Classification Search
CPC ....................... G02F 2001/133614; G02F 2/02
See application file for complete search history.

(56) References Cited

U.S. PATENT DOCUMENTS

| | | | |
|---|---|---|---|
| 2002/0041349 A1* | 4/2002 | Ohkawa | G02B 6/0036 349/65 |
| 2011/0141769 A1* | 6/2011 | Lee | G02B 6/0023 362/629 |
| 2013/0114301 A1* | 5/2013 | Um | G02B 6/0023 362/621 |
| 2014/0185271 A1* | 7/2014 | Hyun | G02B 6/0021 362/84 |

\* cited by examiner

*Primary Examiner* — Phu Vu
(74) *Attorney, Agent, or Firm* — Andrew C. Cheng

(57) ABSTRACT

The disclosure provides a light guiding plate, used in a backlight module. The light guiding plate comprises a main board body and a sub board body. The main board body has an illuminating surface, a back surface opposite to the illuminating surface, and a first incident surface connected with the illuminating surface and the back surface. A plurality of quantum dots is uniformly embedded inside the sub board body. The sub board body is disposed on the first incident surface. The sub board body completely covers the first incident surface. The sub board body has a second incident surface, and the second incident surface is away from the first incident surface. The second incident surface is disposed opposite to a backlight source of the backlight module. The disclosure further provides a backlight module and a display.

12 Claims, 2 Drawing Sheets

LIGHT GUIDING PLATE, BACKLIGHT MODULE AND DISPLAY

CROSS-REFERENCE TO RELATED APPLICATION

This application claims the benefit of, and priority to, Chinese Patent Application No. 201510257881.X, filed May 19, 2015, titled "Light guiding plate, backlight module and display", the entire contents of which are incorporated by reference herein in its entirety.

BACKGROUND

Technical Field

The disclosure is related to the field of liquid crystal display, and more particularly to a light guiding plate, a backlight module and a display.

Description of Related Art

Liquid crystal displays are mainstream panel displays in current market. In general, a backlight is used as a light source in the display for illuminating the liquid crystal display. Generally, conventional backlight modules include a backlight source constituted by LED, the light emitted from the backlight source passes through a light guiding plate such that the light source is converted as a surface light source. After the light is uniformized by a diffusion sheet, the light is emitted from the backlight module, and an image is shown by the light crystal panel. With the development of technology, it is more and more important to improve the quality of displays, and color gamut is an important issue.

At present, quantum dot is highly used for improving the color gamut of the backlight. Quantum dot is a 0-dimensional nano-material, which is constituted by a few amounts of atoms. The diameter of the quantum dot is usually in the range of 1-10 nm. Since electrons and holes are quantified, so that a continuous energy band becomes a separate energy level having the properties of the molecules. Thus, when they are excited, fluorescent can be emitted, so that the color gamut is further changed.

In a backlight module, fluorescent powders are replaced by a thin film of quantum dot. Then the thin film of quantum dot is loaded between the light guiding plate and a prism sheet so as to improve the color gamut of the liquid crystal display. However, the thin film of quantum dot is easily affected by external environment, such as moisture, so that the thickness of package needs to be thick (in general, the thin film of quantum dot has a thickness of greater than 210 m), and the edge of the film may become invalid. Thus, the application in electronic devices, especially thin mobiles phones, is limited.

SUMMARY

The disclosure provides a light guiding plate, which does not affect the thickness of a backlight module and can increase the backlight gamut.

The disclosure also provides a backlight module and a display.

In order to achieve the above purposes, the disclosure provides the following technical solutions:

The disclosure provides a light guiding plate used in a backlight module. The light guiding plate comprises a main board body and a sub board body. The main board body has an illuminating surface, a back surface opposite to the illuminating surface, and a first incident surface connected with the illuminating surface and the back surface. A plurality of quantum dots is uniformly embedded inside the sub board body. The sub board body is disposed on the first incident surface, and the sub board body completely covers the first incident surface. The sub board body has a second incident surface, and the second incident surface is away from the first incident surface. The second incident surface is disposed opposite to a backlight source of the backlight module.

In one embodiment, the plurality of quantum dots is embedded inside the sub board body by in-mold molding.

In one embodiment, the sub board body has a bonding surface opposite to the second incident surface. The bonding surface is completely bonded with the first incident surface. One end surface of the sub board body aligns with the back surface, and another end surface of the sub board body protrudes the illuminating surface.

In one embodiment, the sub board body has a bonding surface opposite to the second incident surface. The bonding surface is completely bonded with the first incident surface. One end surface of the sub board body aligns with the back surface, and another end surface of the sub board body aligns with the illuminating surface.

In one embodiment, a light uniformizing structure is disposed on the illuminating surface, and a light guiding structure is disposed on the back surface.

In one embodiment, the main board body and the sub board body are connected by surficial chemical treatment.

In one embodiment, the size of the plurality of quantum dots is not completely identical.

The disclosure provides a backlight module comprising a plastic frame, a backlight source, and an optical film. The backlight module comprises the light guiding plate. The light guiding plate is disposed at the plastic frame. The optical film is located on the illuminating surface of the light guiding plate. The optical film is laminated with the main board body. The backlight source is at the side of the second incident surface.

In one embodiment, the backlight module further comprises a double-sided adhesive. The double-sided adhesive is used for fixing the plastic frame, the sub board body and the optical film.

The disclosure provides a display. The display comprises a liquid crystal panel and the backlight module. The liquid crystal panel is disposed on the backlight module, and the liquid crystal panel covers the optical film.

According to the disclosure, the light guiding plate is formed by the sub board body and the main board body, the quantum dot, which can change the color gamut, is embedded in the sub board body and is used as the incident portion of the incident light, such that the quality of color gamut is improved, and the light guiding plate can be used while remaining the quantum dot unaffected by the environment. In addition, additional quantum package structure with a thicker thickness is unnecessary, such that the thickness of the backlight modules is decreased, and the thickness of the display device can be even thinner.

In order to more clearly illustrate the features and technical solutions of the disclosure, the accompanying descriptions and drawings are described as blow. It is apparently that the drawings below are merely some embodiments of the disclosure, which do not limit the scope of the disclosure.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
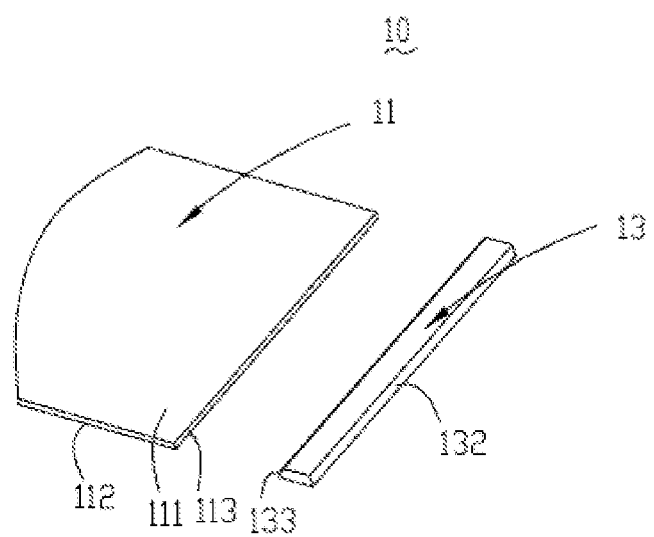
FIG. 1 is a schematic view of the light guiding plate of the preferred embodiment the disclosure.
Figure 2:
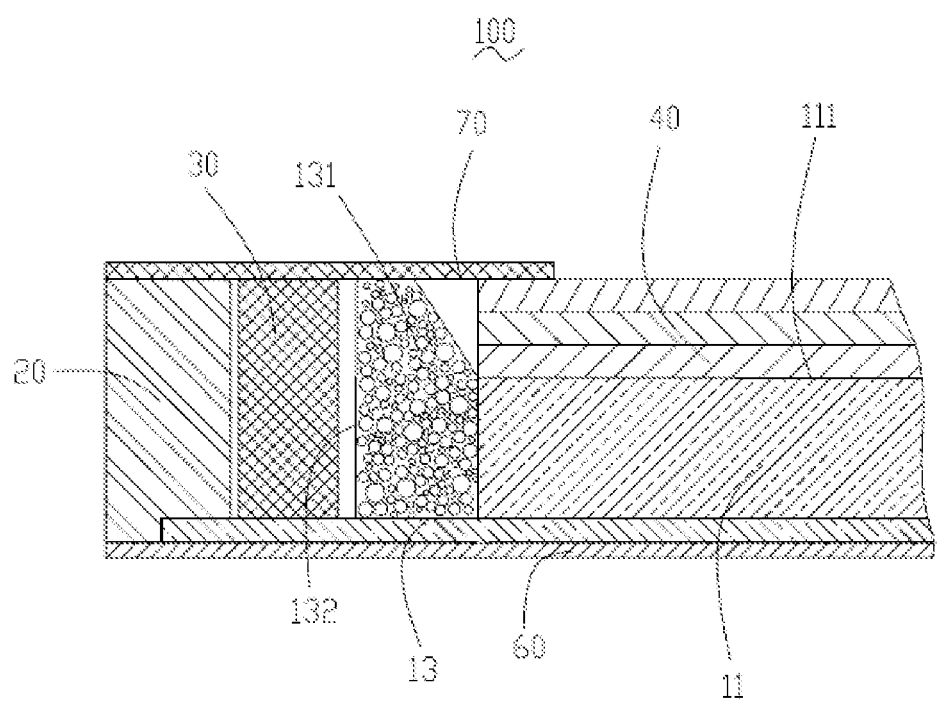
FIG. 2 is a sectional view of the backlight module of the disclosure.

Referring to FIGS. 1 and 2, according to a preferred embodiment of the disclosure, a light guiding plate 10 used in a backlight module 100 is provided. The light guiding plate 10 comprises a main board body 11 and a sub board body 13. The main board body 11 has an illuminating surface 111, a back surface 112 opposite to the illuminating surface 111, and a first incident surface 113 connected with the illuminating surface 111 and the back surface 112. A plurality of quantum dots 131 is uniformly embedded inside the sub board body 13. The sub board body 13 is disposed on the first incident surface 113, and the sub board body 13 completely covers the first incident surface 113. The sub board body 13 has a second incident surface 132, and the second incident surface 132 is away from the first incident surface 113. The second incident surface 132 is disposed opposite to a backlight source 22 of the backlight module 20. In this embodiment, the size of the plurality of quantum dots is not completely identical. In some embodiments, the size of most of the plurality of quantum dots is identical; in some embodiments, the size of a small portion of the plurality of quantum dots is identical; in some embodiments, the size of each of the plurality of quantum dots is different.

In this embodiment, the light guiding plate 10 is a rectangular thin plate formed by the main board body 11 connecting with the sub board body 13. The second incident surface 132 is the incident surface of the light guiding plate 10. The main board body 11 is a rectangular thin plate, and the first incident surface 113 is an end surface of the main board body 11. The sub board body 13 is a rectangular thin plate, and the second incident surface 132 is an end surface of the sub board body 13. The material of the main board body 11 is identical with the material of the sub board body 13 after the quantum dots are removed.

The sub board body 13 has a bonding surface 133 opposite to the second incident surface 132, wherein the bonding surface 133 is completely bonded with the first incident surface 113. The length of the sub board body 13 is identical with the width of the main board body 11, and the length of the second incident surface is identical with the length of the first incident surface. The width of the sub board body 13 is identical with the width of the main board body 11, or the width of the sub board body 13 is greater than the width of the main board body 11.

When the width of the sub board body 13 is identical with the width of the main board body 11, one end surface of the sub board body 13 aligns with the back surface 112, and another end surface of the protrudes the illuminating surface 111. When the width of the sub board body 13 is greater than the width of the main board body 11, one end surface of the sub board body 13 aligns with the back surface 112, and another end surface of the sub board body aligns with the illuminating surface 111. Wherein, the end surfaces of the sub board body 13 are the two end surfaces connected with the second incident surface 132 and the bonding surface 133. Preferably, the width of the sub board body 13 is greater than the width of the main board body 11, and one portion of the sub board body 13 protrudes the illuminating surface 111.

In this embodiment, the plurality of quantum dots 131 is embedded inside the sub board body 13 by in-mold molding. The plurality of quantum dots 131 and the sub board body 13 are injected in the mold at the same time, and then are solidified. The injection temperature of the quantum dot 131 can ensure that the quantum dot does not change its properties. The plurality of quantum dots 131 is completely covered by the external lateral walls of the sub board body 13. The plurality of quantum dots 131 is not injected in the external lateral walls within a certain width for ensuring the performance of the quantum dot.

In this embodiment, a light uniformizing structure is disposed on the illuminating surface 111, and a light guiding structure is disposed on the back surface 112. The light uniformizing structure is a surface formed by a plurality of circles or trapezoids for guiding the light entering the light guiding plate. The light guided from the light guiding plate 10 is more uniform because of the light uniformizing structure. Preferably, a reflective coating layer can ensure that the light emitted from the light guiding plate can be completely emitted outside the illuminating surface 111, such that the utilization rate of the light source is increased. In other embodiments, a reflective sheet is disposed beneath the light guiding plate of the backlight module for reflecting the light, which exposed from the light guiding plate, back to the light guiding plate, such that the utilization rate of the light source is increased.

In this embodiment, the main board body 11 and the sub board body 13 are connected by surficial chemical treatment. More specifically, the bonding surface 133 and the first incident surface 113 are treated by surficial chemical treatment, such that the bonding surface 133 completely bonded with the first incident surface 113, which can ensure that the bonding surface 133 and the first incident surface 113 do not deform.

According to the disclosure, a backlight module comprising a plastic frame 20, a backlight source 30, and an optical film 40 is provided. The light guiding plate 10 is disposed at the plastic frame 20. The optical film 40 is located on the illuminating surface 111 of the light guiding plate 10. The optical film 40 is laminated with the main board body 11. The backlight source 30 is at the side of the second incident surface 132. The plastic frame 20, the backlight source 30, the sub board body 13, and the optical film 40 are fixed by a double-sided adhesive 70.

When the blue light emitted from the LED of the backlight source 30 enters the second incident surface 132, the light entering the quantum dot 113 forms red light and green light, other blue light of LED mix with the red light and the green light of the quantum dot 113 and form white light by the first incident surface 113, and then is emitted from the illuminating surface by the light guiding plate 10.

According to the disclosure, the light guiding plate 10 is formed by the sub board body 13 and the main board body 11. The quantum dot 113, which can change the color gamut, is embedded in the sub board body 13 and is used as the incident portion of the incident light. The light passing through the quantum dot 113 forms red light and green light, then mixes with the blue light of the LED for forming white light. Then the light is emitted from the illuminating surface 111. Thus, the quality of color gamut is improved, and the light guiding plate can be used while remaining the quantum dot unaffected by the environment. The structure of the backlight module can further ensure the closeness of the quantum dot, such that additional quantum package structure with a thicker thickness is unnecessary. Therefore, the thickness of the backlight modules is decreased, and the thickness of the display device can be even thinner.

In this embodiment, the backlight module further comprises a bottom plate. The plastic frame 20 is fixed at the peripheral edge of the bottom plate 60. The plastic frame 20 comprises a peripheral lateral plate. The peripheral lateral plate surrounds an accommodating space for accommodating the light guiding plate 10, the backlight source 30 and the optical film 40. The light guiding plate 10 is laminated with the bottom plate 60.

In this embodiment, the backlight module further comprises a double-sided adhesive 50. The double-sided adhesive 50 is bonded with the plastic frame 20, the sub board body 13 and the optical film 40. In this embodiment, the sub board body 13 and the optical film 40 are fixed with the lateral plate 22 of the plastic frame 20 by double-sided adhesive.

The disclosure provides a display. The display comprises a liquid crystal panel and the backlight module 100. The liquid crystal panel is disposed on the backlight module 100, and the liquid crystal panel covers the optical film 40.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A light guiding plate, used in a backlight module, the light guiding plate comprising:
    a main board body; and
    a sub board body;
    wherein the main board body comprises an illuminating surface, a back surface opposite to the illuminating surface, and a first incident surface connected with the illuminating surface and the back surface; a plurality of quantum dots is uniformly embedded inside the sub board body; the sub board body is disposed on the first incident surface, the sub board body completely covers the first incident surface; the sub board body comprises a second incident surface; the second incident surface is away from the first incident surface, and the second incident surface is disposed opposite to a backlight source of the backlight module;
    wherein the material of the main board body is identical with the material of the sub board body;
    wherein the plurality of quantum dots is embedded inside the sub board body by in-mold molding, and the plurality of quantum dots is completely covered by the external lateral walls of the sub board body and the plurality of quantum dots is not injected in the external lateral walls within a certain width.

2. The light guiding plate according to claim 1, wherein the sub board body comprises a bonding surface opposite to the second incident surface, wherein the bonding surface is completely bonded with the first incident surface, one end surface of the sub board body aligns with the back surface, and another end surface of the protrudes the illuminating surface.

3. The light guiding plate according to claim 1, wherein the sub board body comprises a bonding surface opposite to the second incident surface, wherein the bonding surface is completely bonded with the first incident surface, one end surface of the sub board body aligns with the back surface, and another end surface of the sub board body aligns with the illuminating surface.

4. The light guiding plate according to claim 2, wherein a light uniformizing structure is disposed on the illuminating surface, and a light guiding structure is disposed on the back surface.

5. The light guiding plate according to claim 4, wherein the size of the plurality of quantum dots are not completely identical.

6. A backlight module, comprising:
    a plastic frame;
    a backlight source; and
    an optical film;
    wherein, the backlight module comprises a light guiding plate; the light guiding plate comprises a main board body and a sub board body; the main board body comprises an illuminating surface, a back surface opposite to the illuminating surface, and a first incident surface connected with the illuminating surface and the back surface; a plurality of quantum dots is uniformly embedded inside the sub board body; the sub board body is disposed on the first incident surface; the sub board body completely covers the first incident surface; the sub board body has a second incident surface; the second incident surface is away from the first incident surface; the second incident surface is disposed opposite to a backlight source of the backlight module; the light guiding plate is disposed at the plastic frame; the optical film is located on the illuminating surface of the light guiding plate; the optical film is laminated with the main board body, and the backlight source is at the side of the second incident surface;
    wherein the material of the main board body is identical with the material of the sub board body:
    wherein the plurality of quantum dots is embedded inside the sub board body by in-mold molding, and the plurality of quantum dots is completely covered by the external lateral walls of the sub board body and the plurality of quantum dots is not injected in the external lateral walls within a certain width.

7. The backlight module according to claim 6, wherein the sub board body comprises a bonding surface opposite to the second incident surface, wherein the bonding surface is completely bonded with the first incident surface, one end surface of the sub board body aligns with the back surface, and another end surface of the protrudes the illuminating surface.

8. The backlight module according to claim 6, wherein the sub board body comprises a bonding surface opposite to the second incident surface, wherein the bonding surface is completely bonded with the first incident surface, one end surface of the sub board body aligns with the back surface, and another end surface of the sub board body aligns with the illuminating surface.

9. The backlight module according to claim 7, wherein a light uniformizing structure is disposed on the illuminating surface, and a light guiding structure is disposed on the back surface.

10. The backlight module according to claim 9, wherein the size of the plurality of quantum dots is not completely identical.

11. The backlight module according to claim 6, wherein the backlight module further comprises a double-sided adhesive, wherein the double-sided adhesive is used for fixing the plastic frame, the sub board body and the optical film.

12. A display comprising a liquid crystal panel and a backlight module according to claim 6, wherein the liquid crystal panel is disposed on the backlight module, and the liquid crystal panel covers the optical film.

* * * * *

UNITED STATES PATENT AND TRADEMARK OFFICE
CERTIFICATE OF CORRECTION

PATENT NO. : 9,766,387 B2  
APPLICATION NO. : 14/655592  
DATED : September 19, 2017  
INVENTOR(S) : Lingyan Chen Page 1 of 1

It is certified that error appears in the above-identified patent and that said Letters Patent is hereby corrected as shown below:

On the Title Page

Item (73) should read:
(73) Assignee: "Wuhan China Star Optoelectronics Technology Co., Ltd; Wuhan, Hubei, China"

Signed and Sealed this
Twenty-fourth Day of July, 2018

Andrei Iancu
*Director of the United States Patent and Trademark Office*